(12) United States Patent
Yoshida

(10) Patent No.: US 6,229,598 B1
(45) Date of Patent: May 8, 2001

(54) ELECTRO-OPTIC DISTANCE MEASURING APPARATUS

(75) Inventor: Hisashi Yoshida, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/487,810

(22) Filed: Jan. 20, 2000

Related U.S. Application Data

(63) Continuation of application No. 09/023,201, filed on Feb. 12, 1998, now abandoned.

(30) Foreign Application Priority Data

Feb. 14, 1997 (JP) .................................................. 9-030080

(51) Int. Cl.$^7$ ............................................................ G01C 3/08
(52) U.S. Cl. ............................................ 356/5.01; 356/5.03
(58) Field of Search .................................. 356/5.01–5.08, 356/5.12

(56) References Cited

U.S. PATENT DOCUMENTS

| | | |
|---|---|---|
| 3,619,058 * | 11/1971 | Hewlett et al. . |
| 3,728,026 * | 4/1973 | Idestrom et al. . |
| 3,752,581 * | 8/1973 | Everest et al. . |
| 3,900,260 * | 8/1975 | Wendt . |
| 4,113,381 * | 9/1978 | Epstein . |
| 4,113,831 | 9/1978 | Epstein ................................... 356/5 |
| 4,153,366 * | 5/1979 | Mamon et al. . |
| 4,159,873 * | 7/1979 | Farnsworth . |
| 4,498,764 * | 2/1985 | Bolkow et al. . |
| 4,521,107 * | 6/1985 | Chaborski et al. . |
| 4,699,508 * | 10/1987 | Bolkow et al. . |
| 5,054,911 * | 10/1991 | Ohishi et al. . |
| 5,206,697 * | 4/1993 | Schwartz . |
| 5,880,822 * | 3/1999 | Kubo . |

FOREIGN PATENT DOCUMENTS

| | | |
|---|---|---|
| 59-24397 | 6/1984 | (JP) . |
| 3-21502 | 8/1985 | (JP) . |

* cited by examiner

Primary Examiner—Stephen C. Buczinski
(74) Attorney, Agent, or Firm—Foley & Lardner

(57) ABSTRACT

A distance measuring apparatus has a light sending unit for sending pulsed light into a ranging optical path, a photodetective element for receiving pulse light reflected, and a signal processing section for measuring a period between The time of sending and the time of reception, the signal processing section determines whether to apply a first state in which one reflected pulsed beam is detected in response to the sending of the pulsed light or a second state in which two reflected pulsed beams are detected in response to the sending of the pulsed light. The signal processing section measures a period from the time of sending to reception of the first reflected pulsed beam in the first state, while the signal processing section measures a period from the time of sending to reception of the second reflected pulsed beam in the second state.

9 Claims, 12 Drawing Sheets

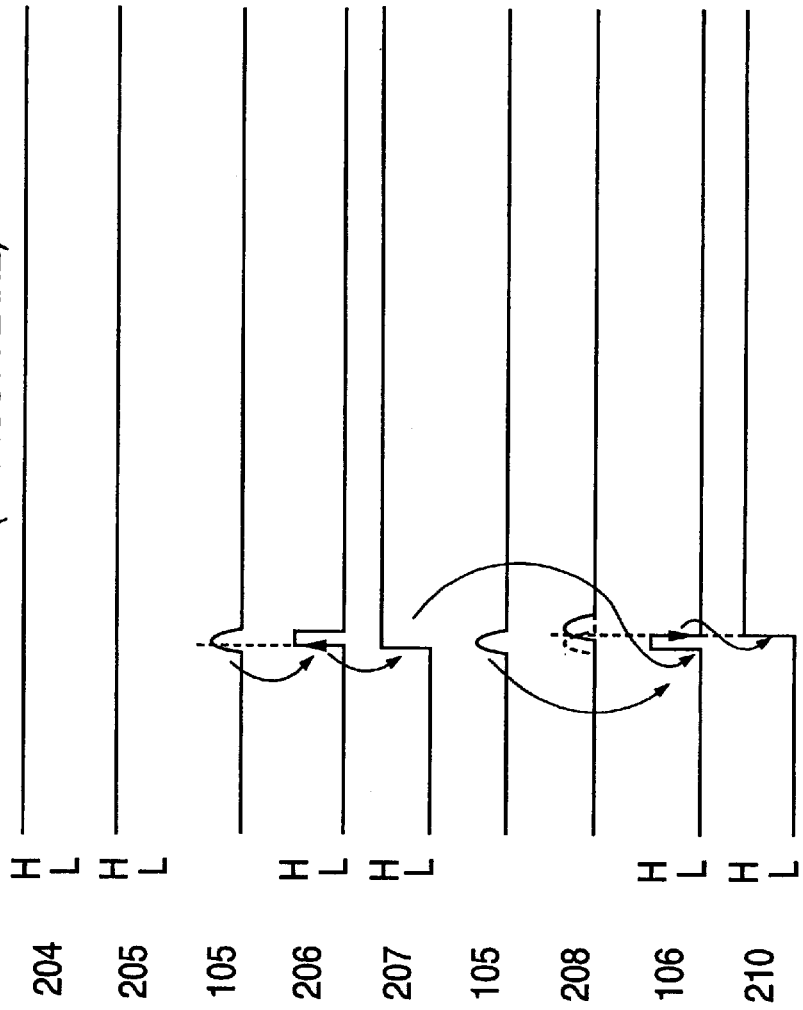

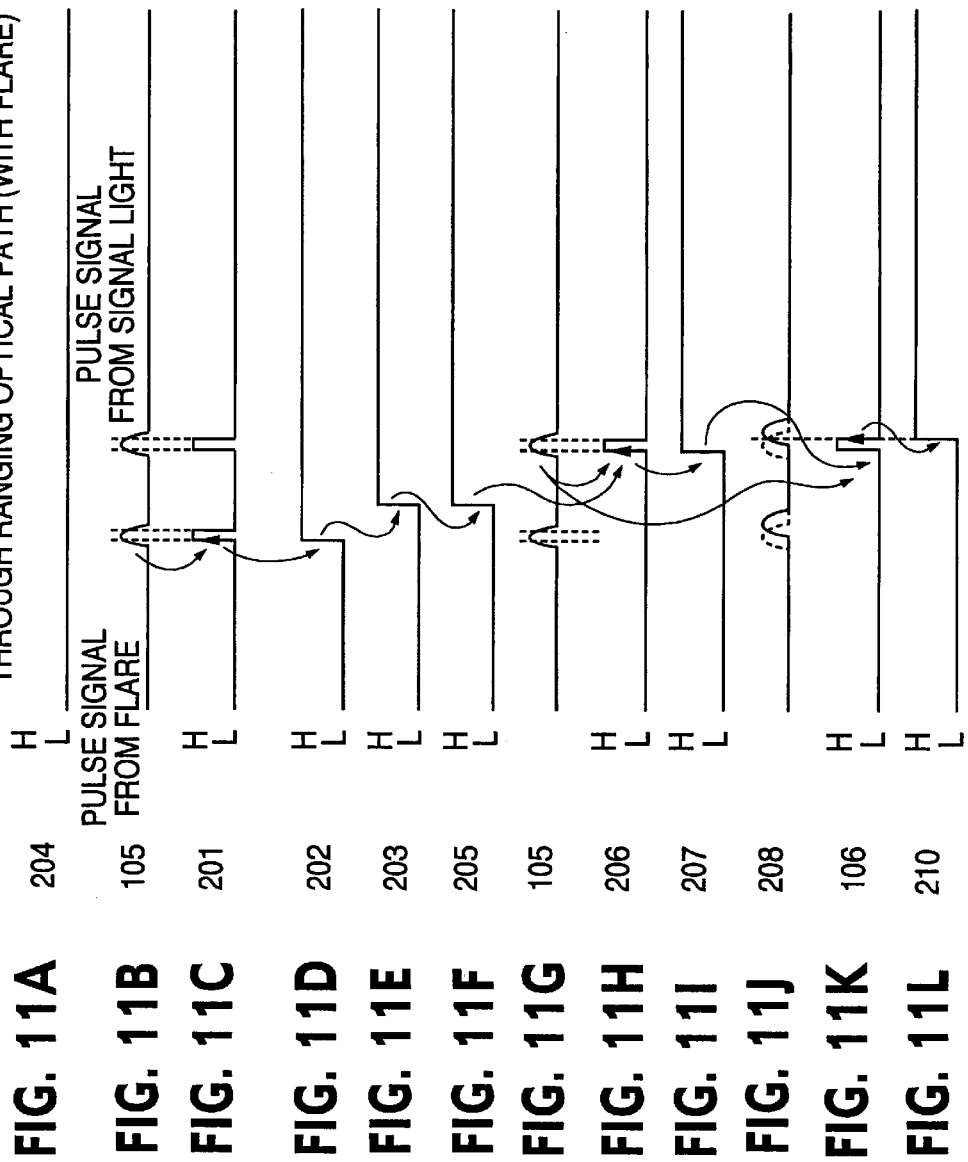

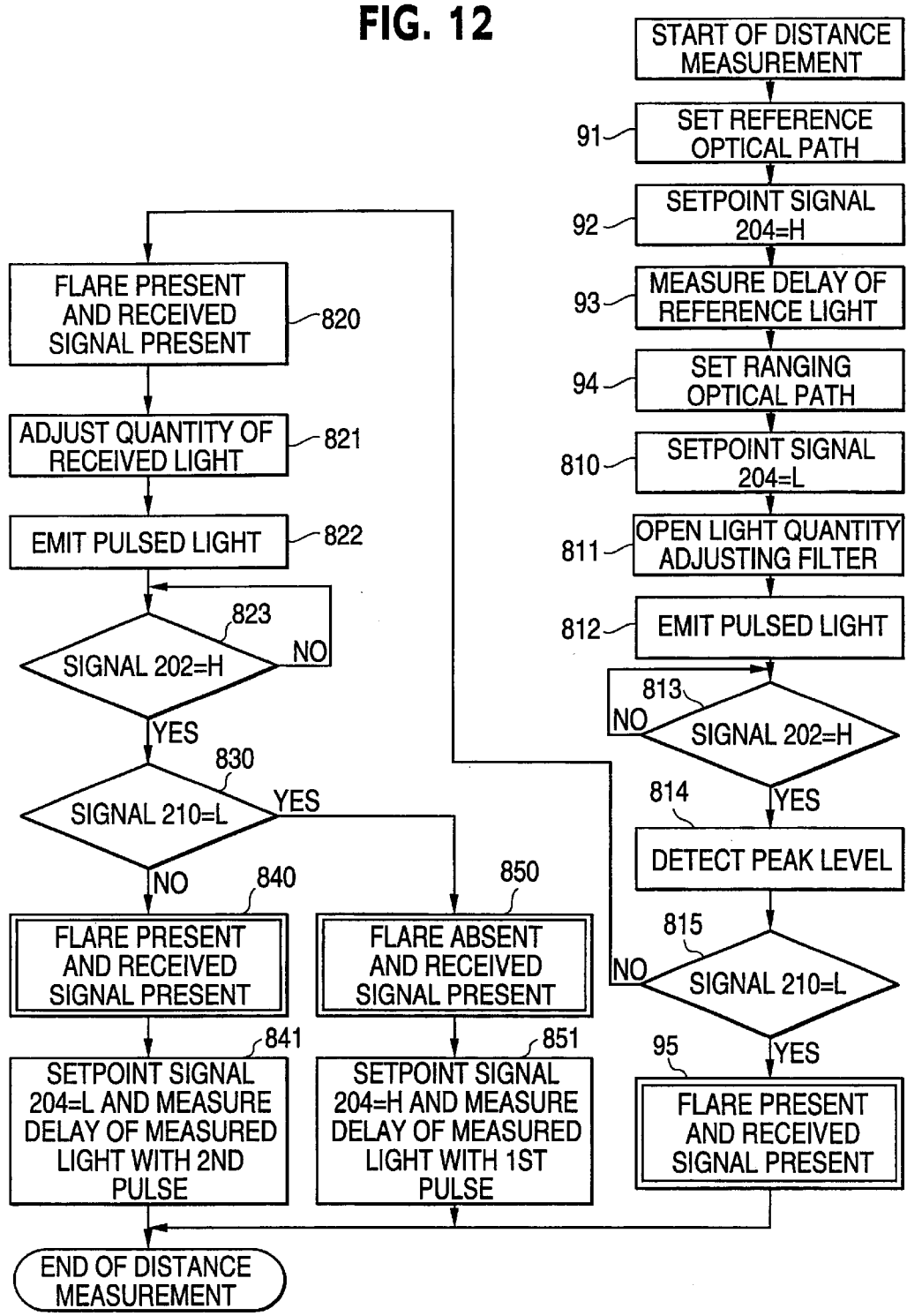

ELECTRO-OPTIC DISTANCE MEASURING APPARATUS

This is a continuation of application Ser. No. 09/023,201 filed Feb. 12, 1998 now abandoned.

BACKGROUND OF THE INVENTION

1. Field of the Invention

The present invention relates to an electro-optic distance measuring apparatus and method for measuring a distance to a measured object by use of pulse light and, more particularly, to an electro-optic distance measuring apparatus and method that can eliminate a measurement error due to flare produced upon sending the pulse light.

2. Related Background Art

Examples of the conventional distance measuring apparatus using light are disclosed in Japanese Patent Publication No. Sho 59-24397 and Japanese Utility Model Publication No. Hei 3-21502. Such a distance measuring apparatus is used as a surveying equipment in the fields of civil engineering and architecture and the details thereof are described in Japanese Laid-open Patent Application No. Sho 53-64056.

SUMMARY OF THE INVENTION

The biaxial and coaxial structures are known as to optical systems of the distance measuring apparatus from the viewpoint of relative locations of sending optical path and receiving optical path. Among them, the coaxial optical systems are advantageous in decreasing the scale of apparatus, avoiding the parallax, and installing a collimation optical path for collimating the sending optical path to the measured object. Namely, they are optical systems of the sending and receiving light coaxial type in which the sending optic axis of the light wave used in distance measurement coincides with the receiving optic axis for receiving reflected light from the measured object.

Meanwhile, the distance measuring methods of the distance measuring apparatus using the light wave are classified roughly into a continuous modulated wave method using an LED or a semiconductor laser as a light source and a pulse method using the light source of a pulse-drivable semiconductor laser capable of outputting a pulsa beam with high peak power. With these distance measuring apparatus, there have been and are desires for increase in the maximum measurement range and increasing desires for measurement performance in a non-prism state without using a reflector such as a corner cube prism at a measuring point in order to save labor and increase efficiency of work. For meeting such demands, the pulse method that can use the high peak power is definitely advantageous.

However, when the pulse light with high peak power is projected into the sending optical path by use of the coaxial optical systems, light reflected by the inside surface of an objective lens and the internal surface of a lens barrel is received as flare in the receiving optical path to cause a large error in measured values.

These optical systems are of the coaxial support structure in which a small-diameter lens barrel housing a light emission system is disposed coaxially in front of a large-aperture lens barrel housing a light receiving system. First, it is thus impossible to dispose the collimation optical system for sighting the measured object coaxially with the optic axis of a ranging optical system, because the collimation optical path is interrupted by the small-diameter lens barrel disposed ahead. This makes it difficult for a measuring person to see the measuring point, particularly, in the case of the non-prism measurement. Second, since the small-diameter lens barrel of the light emission system is disposed in front of the large-aperture lens being a receiving lens, the small-diameter lens barrel itself and wires, etc., from the power supply for supplying the power to the light source of the light emission system also interrupt the receiving lens, causing decrease in the quantity of received light and in turn narrowing the maximum measurement range.

A first distance measuring apparatus has light sending means for sending pulsed light, light receiving means for receiving reflected pulsed light, and a signal processing section for measuring a period from the light sending time to the light receiving time, wherein the signal processing section is arranged to make a decision on either a first state in which the reflected pulsed light from a measured object is detected without reflected pulsed light due to flare in response to sending of the pulsed light or a second state in which the reflected pulsed light from the measured object is detected with the reflected pulsed light due to the flare, to measure a period from the sending time to reception of the reflected pulsed light from the measured object in the first state, and to measure a period from the sending time to reception of the reflected pulsed light from the measured object while ignoring the reflected pulsed light due to the flare, in the second state.

This apparatus is arranged to make the decision on whether the reflected pulsed light due to the flare is detected or not when the pulsed light is sent into the ranging optical path; according to the decision, when the reflected pulsed light due to the flare is detected, the apparatus measures a delay time of the reflected pulsed light from the measured object while ignoring the reflected pulsed light due to the flare. Therefore, this apparatus is free of the measurement error due to the flare.

A second distance measuring apparatus has light sending means for sending pulsed light, light receiving means for receiving reflected pulsed light, and a signal processing section for measuring a period from the sending time to the receiving time, wherein the signal processing section is arranged to make a decision on either a first state in which a reflected pulsed beam is detected in response to the sending of the pulsed light or a second state in which two reflected pulsed beams are detected in response to the sending of the pulsed light, to measure a period from the sending time to reception of the first reflected pulsed beam in the first state, and to measure a period from the sending time to reception of the second reflected pulsed beam in the second state.

This apparatus is arranged to eliminate the measurement error caused by the reflected pulsed light due to the flare after discriminating the case wherein two pulsed are detected of the reflected pulsed light due to the flare and the reflected pulsed light from the measured object, from the case wherein one pulsed is detected of the reflected pulsed light from the measured object.

A third distance measuring apparatus is an electro-optic distance measuring apparatus having light sending means for sending pulsed light, light receiving means for receiving reflected pulsed light, and a signal processing section for measuring a period from the sending time to the receiving time, wherein the signal processing section comprises a first pulse detecting circuit for detecting a received pulse signal after photoelectric conversion of received pulsed light to generate a first detection signal, a received timing detecting circuit activated by a setpoint signal or the first pulse detection signal to detect the received pulse signal, to generate a second detection signal, and to detect timing of the received pulse signal, and a control section for setting the setpoint signal in a non-active level to monitor presence or absence of the second detection signal generated with sending of the pulsed light, setting the setpoint signal in an active level upon absence of the second detection signal to carry out a distance measuring step, and setting the setpoint signal in the non-active level upon presence of the second detection signal to carry out the distance measuring step.

According to the present invention, presence or absence of the reflected pulsed light due to the flare is determined by simply switching the setpoint signal and the delay time can be measured while ignoring the reflected pulsed light due to the flare, depending upon the determination result.

A first distance measuring method is an electro-optic distance measuring method comprising steps of sending pulsed light into a ranging optical path, receiving pulsed light reflected by a measured object, and measuring a distance, based on a period from the sending of light to the receiving of light, wherein when reflected pulsed light due to flare is detected in response to the sending of the pulsed light, the distance is measured based on the period from the sending of light to the receiving of light while ignoring the reflected pulsed light due to the flare.

Since this method measures the delay time while ignoring the reflected pulsed light due to the flare, it can prevent the measurement error due to the flare.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 10A, 10B, 10C, 10D, 10E, 10F, 10G, 10H and 10I are timing charts for explaining the operation of the circuit of FIG. 9;

FIGS. 11A, 11B, 11C, 11D, 11E, 11F, 11G, 11H, 11I, 11J, 11K and 11L are timing charts for explaining the operation of the circuit of FIG. 9; and FIG. 12 is an overall measurement flowchart utilizing the circuit of FIG. 9.

DESCRIPTION OF THE PREFERRED EMBODIMENTS

A surveying device having the electro-optic distance measuring apparatus TS according to an embodiment will be described by reference to the drawings.

Figure 1:
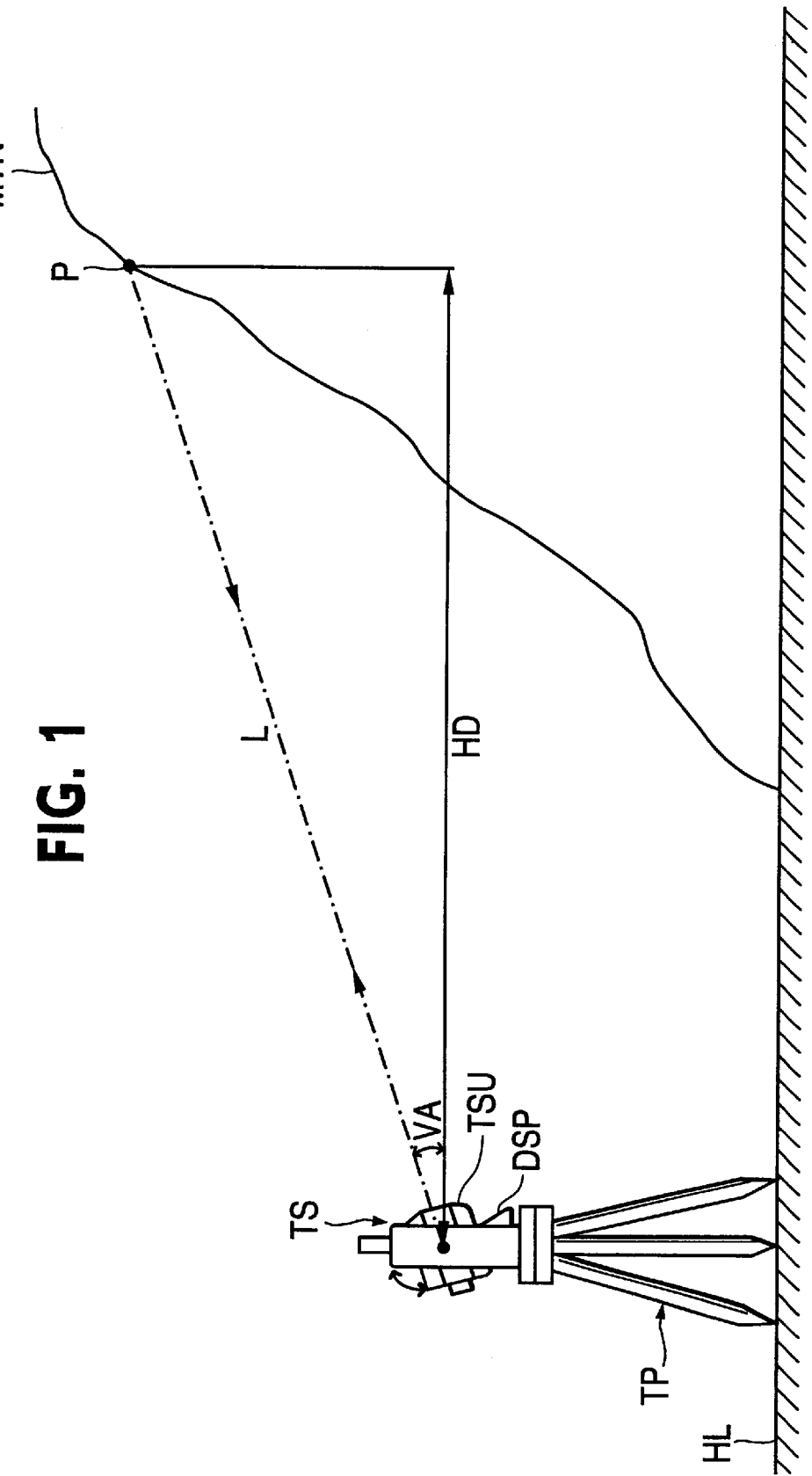
FIG. 1 is a drawing for explaining a surveying method.

FIG. 1 is a drawing for explaining the surveying method. For surveying, first, the surveying device incorporating the electro-optic distance measuring apparatus TS on tripod TP is placed on horizontal ground level HL. If the ground level HL is not horizontal, an adjusting screw not illustrated will be turned so that the central, vertical axis of the electro-optic distance measuring apparatus TS becomes perpendicular to the horizontal plane. The adjusting screw mechanism of this type is described in U.S. Pat. No. 4,113,381 (Japanese Laid-open Patent Application No. Sho 53-64056). This surveying device is measuring a horizontal distance ED to a measured point P in the middle range of a mountain MTN.

The electro-optic distance measuring apparatus TS is a so-called total station also having the function of theodolite or transit. The electro-optic distance measuring apparatus TS has a telescope unit TSU that can be rotated in the vertical plane and is mounted on the tripod TP so as to be rotatable in the horizontal plane. Angles are measured by a rotary encoder RE illustrated in FIG. 5 and this structure is described in U.S. Pat. No. 4,113,381 (Japanese Laid-open Patent Application No. Sho 53-64056).

The telescope unit TSU emits pulse light for distance measurement. The pulsed light reflected at the measured point P is incident into the telescope unit TSU. The apparatus can measure a distance L to the measured point P from a period 2T between the time of emission of the pulsed light and the time of incidence and the speed of light c. The horizontal distance HD can be calculated from the distance L and an angle VA between the horizontal line and the optic axis of the telescope unit TSU and the arithmetic is carried out by the electronic circuit in the distance measuring apparatus TS. Specifically, if the correction described hereinafter is not made in the telescope unit TSU, $L = c \times T$ $HD = L \times \cos VA.$ A prism for reflecting the pulse light may be positioned at the measured point.

Figure 5:
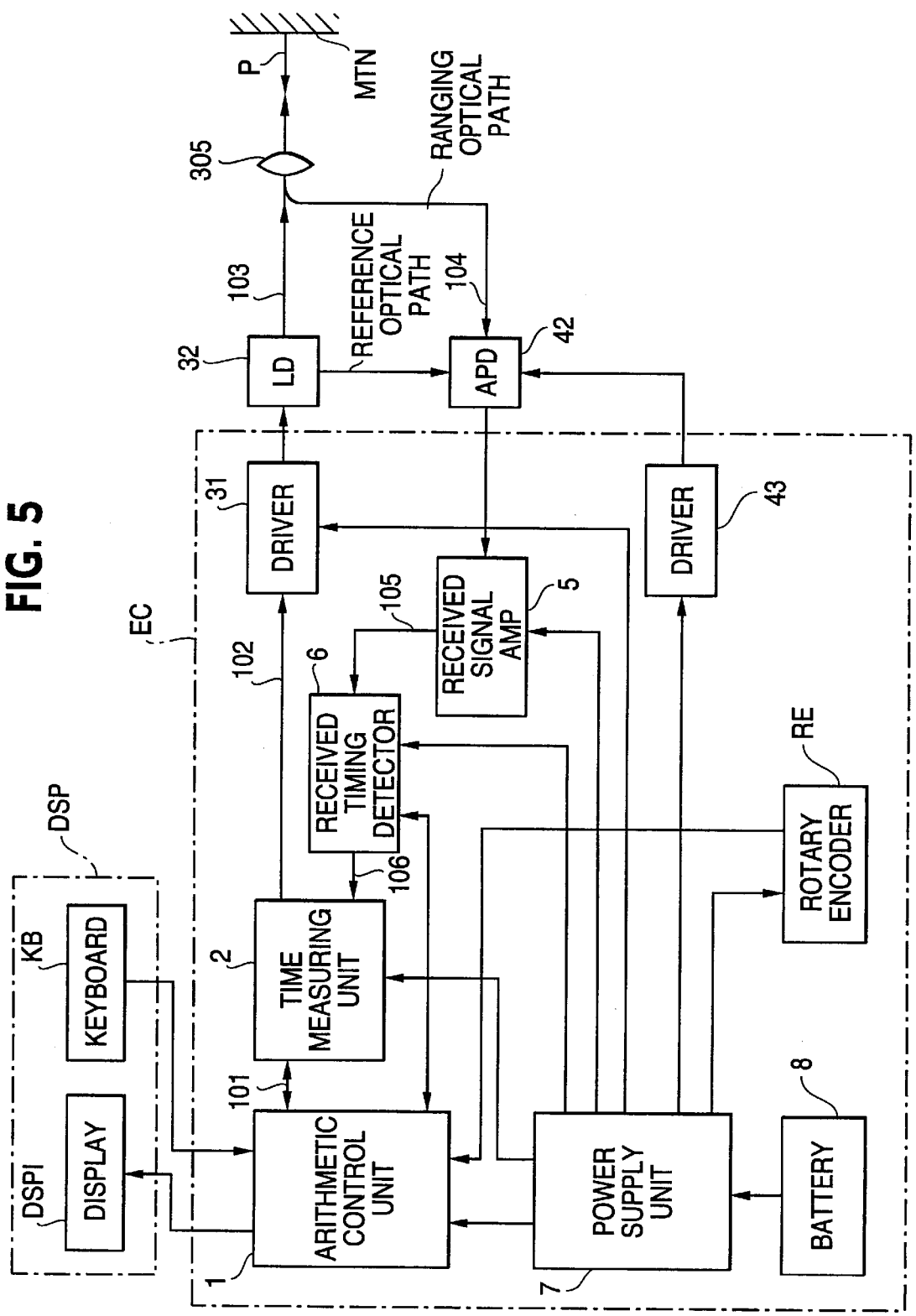
FIG. 5 is a block diagram of an electronic circuit EC in the present distance measuring apparatus TS.

The horizontal rotation angle HA and vertical rotation angle VA, measured by the rotary encoder RE of this distance measuring apparatus TS, and the horizontal distance HD, calculated by arithmetic control unit (arithmetic control circuit) 1 Illustrated in FIG. 5, are displayed on a display DSP of the distance measuring apparatus TS.

Figure 2:
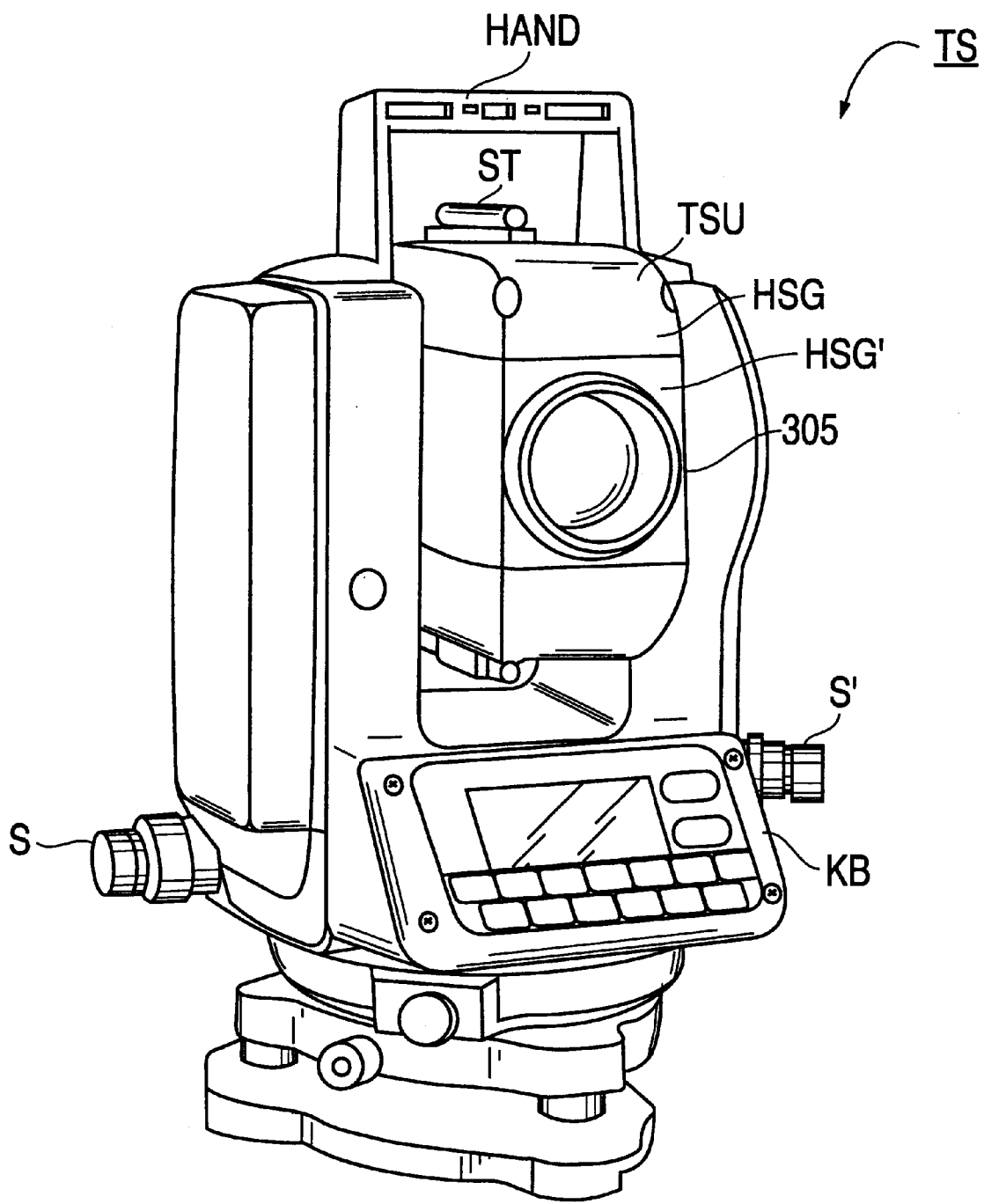
FIG. 2 is a perspective view of an electro-optic distance measuring apparatus TS.

FIG. 2 is a perspective view of the electro-optic distance measuring apparatus TS. A battery and the electronic circuit are disposed in support housing HSG' of a nearly U-shape. The telescope unit TSU having objective lens 305 in the front surface thereof has a rotary housing HSG and a sight unit ST is provided on the top surface of the housing HSG. The rotary housing HSG is rotatable in the horizontal plane around the vertical axis, and is rotatable in the vertical plane around the horizontal axis. Adjusting screws S and S' are provided outside the U-shaped housing HSG' and are used to change the posture of the housing. The rotary housing HSG is disposed between the outside opposite surfaces of the U-shaped housing HSG' and is supported so as to be rotatable thereon. A handle HAND is attached to the top end of the U-shaped housing HSG'. The display DSP is provided in the base part of the U-shaped housing HSG'.

Figure 3:
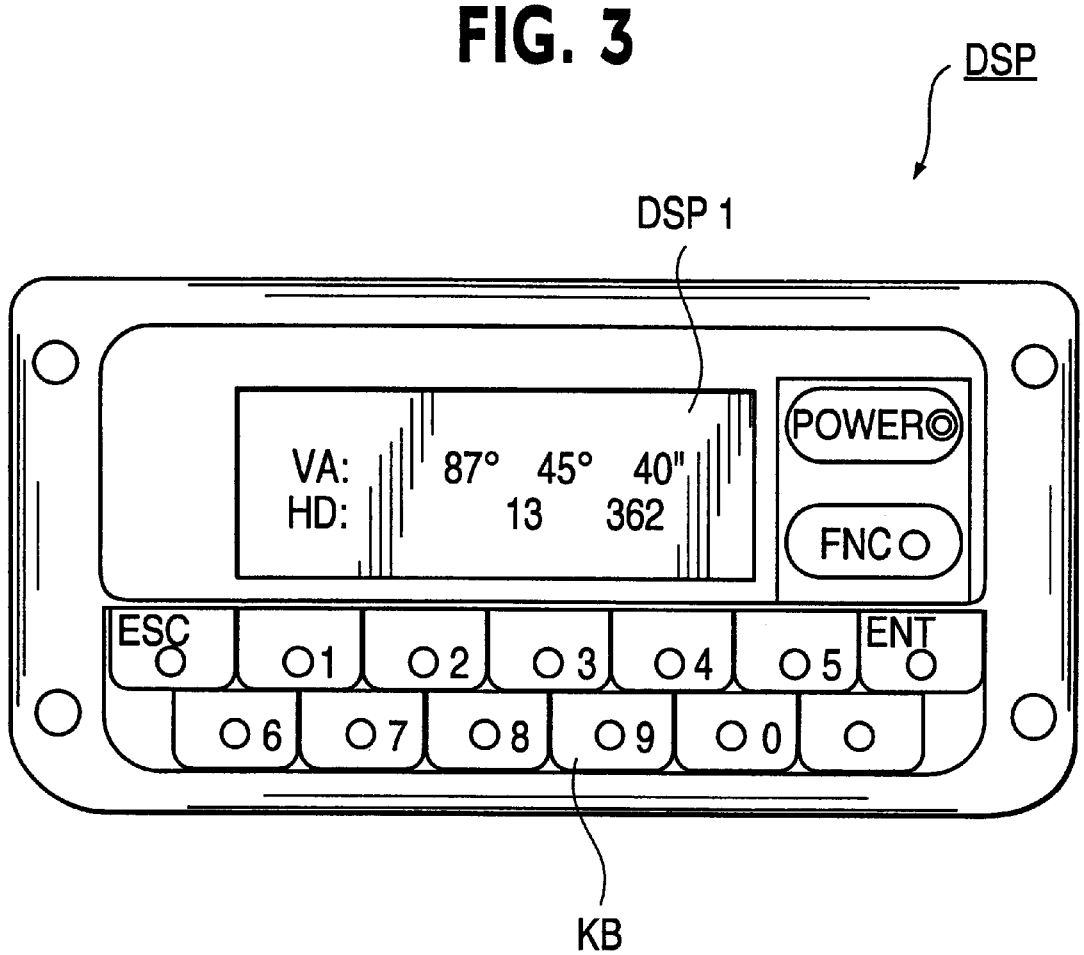
FIG. 3 is a plan view of a display DSP.

FIG. 3 is a plan view of the display DSP. The display DSP is composed of liquid-crystal display section DSP1 and control keyboard KB. The display DSP is electrically connected to the electronic circuit in the housing HSG' and displays the aforementioned horizontal rotation angle HA, vertical rotation angle VA, and horizontal distance HD, and the residual quantity of the battery on the display section thereof SDP1. The keyboard section KB has a power button for power on, function selecting buttons for selecting start of distance measurement and start of measurement of angle, an enter button for determining a selected function, and an escape button for canceling the various commands, and the operator depresses these buttons with necessity.

Figure 4:
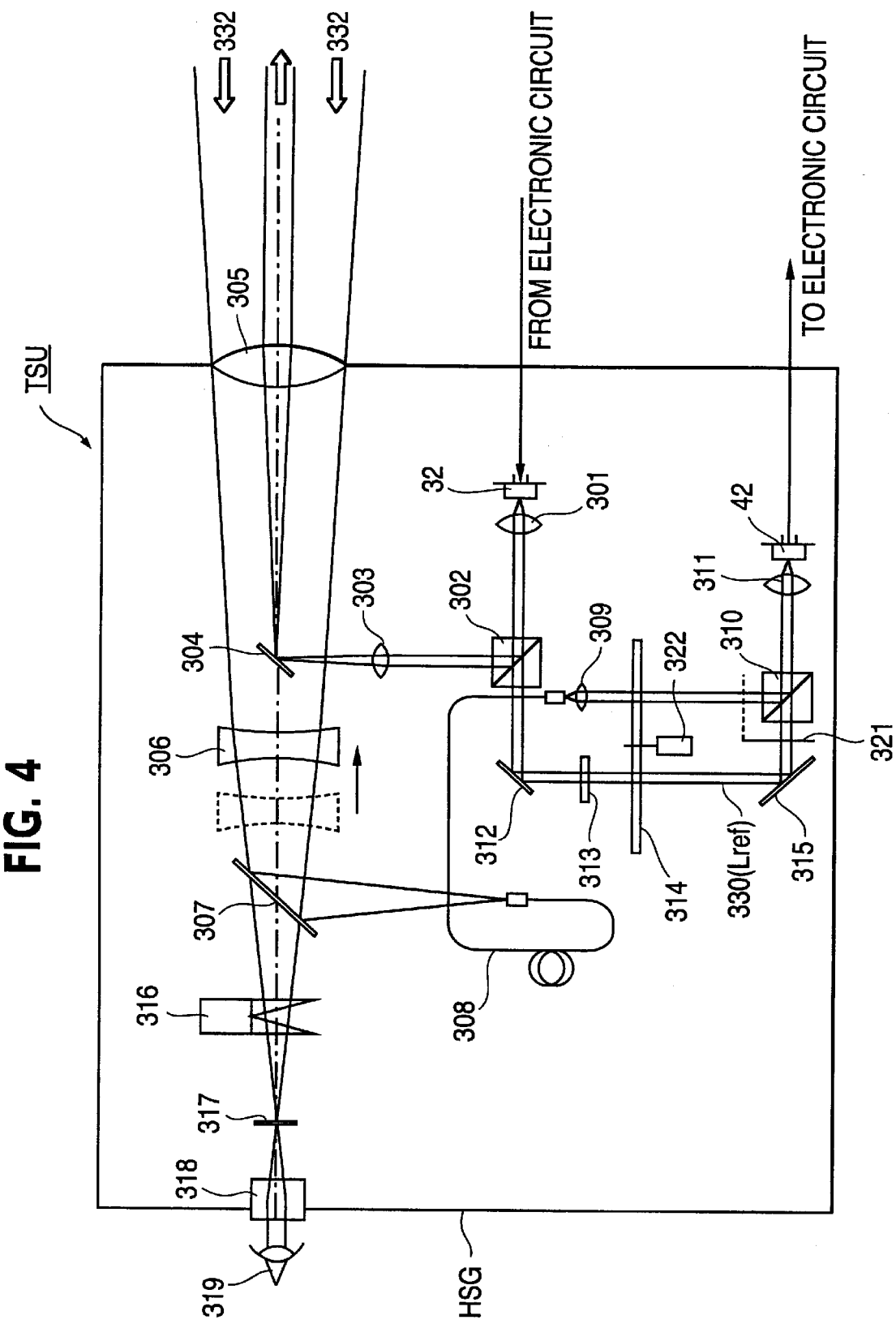
FIG. 4 is a drawing to show the internal structure of a telescope unit TSU of the apparatus.

FIG. 4 is a drawing to show the internal structure of the telescope unit TSU. The pulsed light emitted from semiconductor laser 32 is collimated by collimator lens 301 to enter prism 302. The prism 302 has, for example, the characteristic of a ratio of transmission T against reflection R being T:R=1:99, and the pulsed light sent to reference optical path 330 is attenuated heavily. The pulsed light is reflected by mirror 312 and then passes attenuating filter 313 preliminarily adjusted and set upon assembly. Further, the pulse light passes light quantity adjusting filter 314 and then is reflected by mirror 315. Path changeover shutter 321 opens the optical path on the mirror 315 side when the measurement is carried out in the reference optical path 330. Then the pulsed light from the reference optical path 330 passes through prism 310 and collimator lens 311 to irradiate APD (avalanche photodiode) 42, which is being a photodetective element with high sensitivity.

On the other hand, the pulsed light reflected by the prism 302 and coming out on the ranging optical path side passes through collimator lens 303 and is sent via dichroic mirror 304 toward the objective lens 305. Therefore, the dichroic mirror 304 and objective lens 305 compose the sending optical system. The pulsed light 332 reflected by the measured object and returning to the apparatus is received by the objective lens 305 and then passes focusing lens 306 and dichroic mirror 307 to enter optical fiber 308. The above dichroic mirrors 304 and 307 have, for example, such characteristics to reflect the infrared light but transmit the visible light.

The reflected pulsed light incident into the optical fiber 308 passes through collimator lens 309 and then is attenuated to a predetermined quantity by the light quantity adjusting filter 314 to be reflected by the prism 310 and then received by the photodetective element 42. When the ranging optical path side is selected, the path changeover shutter 321 closes the reference optical path and opens the path on the optical fiber 308 side. As described above, the objective lens 305, focusing lens 306, and dichroic mirror 307 compose the receiving optical system.

The light quantity adjusting filter 314 attenuates the reflected pulsed light down to the same light quantity level as the pulsed light on the reference optical path side. However, when the quantity of the reflected pulsed light is smaller than that of the pulsed light on the reference optical path side, driving motor 322 drives the filter so that the reference light is attenuated without attenuating the reflected light. For making the maximum measured distance as long as possible, the quantity of the reflected pulsed light will be attenuated by the light quantity adjusting filter 314 only if the quantity of the reflected pulsed light is higher than that of the reference light; if the reflected pulsed light is weak, the reference light will be attenuated without attenuating the reflected pulsed light, thus adjusting the quantities of the both beams in the same level.

FIG. 4 further illustrates the collimation optical system for aligning the optic axis of the sending and receiving optical systems with the direction toward the measured object. Namely, the collimation optical system is composed of eyepiece 318, reticle 317, erect prism 316, focusing lens 306, and objective lens 305 with respect to the operator 319. The dichroic mirrors 304, 307 both have the characteristics to transmit the visible light. As described, the telescope unit TSU shown in FIG. 4 is constructed in such structure that the collimation optical system is also arranged coaxially with the common optic axis of the sending optical system and receiving optical system. Therefore, the distance measuring apparatus can be made in the compact scale.

FIG. 5 is a block diagram of the electronic circuit EC of the present distance measuring apparatus TS. The arithmetic control unit 1 comprised of a CPU or the like gives a ranging command signal 101 to time measuring unit 2 in response to a ranging command from the operator or the like. The time measuring unit 2 has, for example, a counter and it gives a pulse emission command 102 to the light sending system and starts measurement of time by the counter.

The light sending system has, for example, semiconductor laser driving circuit 31, semiconductor laser 32 as a light emitting element driven thereby, and the aforementioned sending optical system for sending pulsed light 103 emitted therefrom. This pulsed light is guided through the ranging optical path onto the measured object; or, the pulsed light is sent to the reference optical path.

The pulsed light 104 returning via the ranging optical path or the reference optical path is received by APD 42 via the receiving optical system in the light receiving system and then is subjected to photoelectric conversion. This APD 42 is driven by APD driving circuit 43. A received pulse signal after the photoelectric conversion is amplified by received signal amplifying unit 5 and received pulsed signal 105 amplified is supplied to received timing detecting unit 6.

The received timing detecting unit 6 detects a pulsed signal equal to or higher than a predetermined peak value and outputs received timing signal 106 to the time measuring unit 2. The time measuring unit 2 terminates the time measurement at the timing of received timing signal 106 and transmits the measurement result to the arithmetic control unit 1. Then the arithmetic control unit 1 calculates the distance L and horizontal distance HD to the measured object from the measured time and the speed of light, etc., and displays these arithmetic results etc. on the display section DSP1.

Since such electro-optic distance measuring apparatus is normally often used outdoor, it is equipped with the battery 8. The power supply of the battery 8 supplies the power of voltage suitable for each circuit through power supply unit 7.

Figure 6:
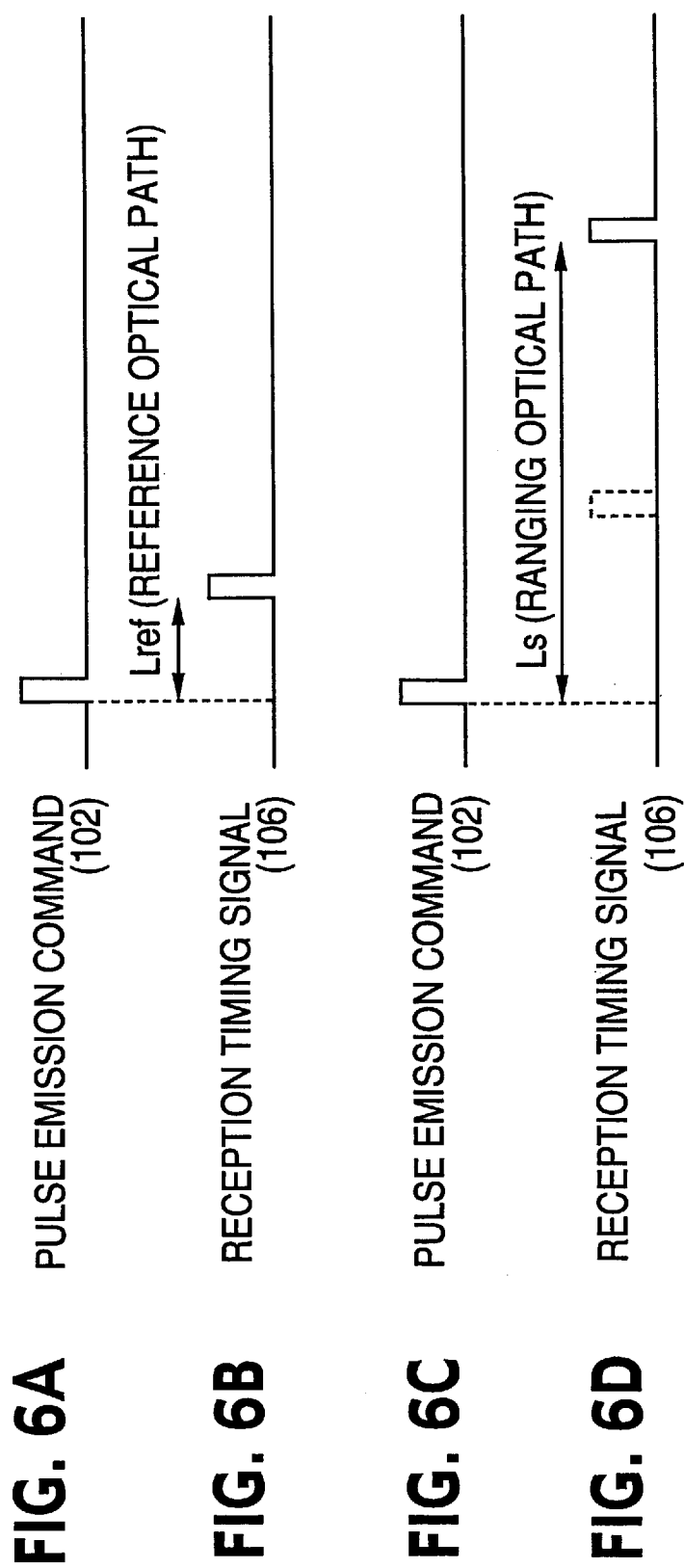
FIGS. 6A, 6B, 6C and 6D are timing charts for explaining the distance measuring method using the above apparatus TS.

FIG. 6A to FIG. 6D are timing charts for explaining the distance measuring method using the above-stated apparatus TS. FIG. 6A and FIG. 6B show the relation between pulse emission command 102 and received timing signal 106 in the case of passage through the reference optical path. FIG. 6C and FIG. 6D show the relation between pulse emission command 102 and received timing signal 106 in the case of passage through the ranging optical path to the measured object MTN.

The reference optical path is provided in the housing HSG of the distance measuring apparatus TS, and the pulsed light emitted from LD 32 is greatly attenuated in the power thereof by the prism, etc., and is guided via the reference optical path into the photodetective element 42. The time measuring unit 2 measures the time-t from the pulse emission command 102 to the received timing signal 106 as described above, and the arithmetic control unit 1 calculates a measured distance (Lref=c×t/2) in the reference optical path, based on the measured time t and the speed of light c.

Separately from it, the pulsed light is sent to the measured object and the pulsed light is reflected by the measured object MTN to return to the apparatus. In response to detection of the pulsed light in the photodetective element 42, the received timing signal 106 is generated. In the same way as above a measured distance (Ls=c×T/2) in the ranging optical path is obtained by the arithmetic.

The electronic circuit EC shown in FIG. 5 changes its delay characteristics depending upon the power of pulse signal received and photoelectrically converted in the photodetective element 42. Therefore, the light quantity adjusting filter (attenuator) 314 is adjusted, as described above, so that the power of the pulsed light received via the reference optical path is equivalent to that of the pulsed light received via the ranging optical path. Further, the electronic circuit EC changes its delay characteristics depending upon the temperature. A reason that can be contemplated is that the operation of circuit elements normally becomes more active with increase in the temperature. Accordingly, the present embodiment is arranged so that the arithmetic control unit 1 subtracts the measured distance Lref in the reference optical path having a known length from the measured distance Ls in the ranging optical path so as to cancel the above-stated delay error due to the temperature, thereby computing the true distance (L=LS−Lref). The arithmetic control unit 1 computes the horizontal distance HD, based on the aforementioned equation, using the above arithmetic result L and the signal indicating the vertical angle VA from the rotary encoder RE, and makes the display DSP display the arithmetic result.

When the pulsed light of high power described above is sent to the sending optical system, it is reflected, for example, by the inside surface of the objective lens 305 to be incident via the dichroic mirror 307 into the optical fiber 308. Such light is called flare and is the cause of the measurement error in the ranging optical path.

Specifically, the measured distance in the ranging optical system is computed based on the speed of light and the period from the pulse emission command 102 to the received timing signal 106 which, indicates that the received timing detecting unit receives a pulse signal over the certain threshold value, as shown in FIG. 6A to FIG. 6D. If the flare is incident as relatively strong pulsed light into the photodetective element 42 as indicated by the dashed line of FIG. 6D, the pulsed light due to the flare will be detected erroneously as reflected pulsed light. The regular reflected pulse light is detected after the pulsed light of flare.

In addition, the pulsed light due to the flare is not always a pulse signal to be detected by the received timing detecting unit 6. Namely, as described previously, the light quantity adjusting filter 314 adjusts the quantity of light in the ranging optical path so that the quantities of the reflected pulse light and reference pulsed light are kept in the same level without decreasing the quantity of weak reflected pulsed light. Accordingly, when the quantity of the reflected pulse light is small, the pulsed light due to the flare is received by the photodetective element 42 without being attenuated. On the other hand, when the quantity of the reflected pulsed light is large, the pulsed light due to the flare is also attenuated similarly and will not be detected in some cases.

Even in the case of the distance measuring apparatus only requiring relatively moderate accuracy and not using the reference optical path, the same problem will arise from adjustment of light quantity carried out, for example, for keeping the quantity of the reflected pulsed light within the dynamic range of the electronic circuit EC.

It is also possible to employ a method for eliminating the flare itself by improving the structure of optical system. However, it will result in decreasing the quantity of received light and failing to increase the maximum measured distance.

In the apparatus TS, first, the quantity of light on the ranging optical path side is adjusted by the light quantity adjusting filter 314. Then the pulsed light is sent to the ranging optical path to check (a) whether the photodetective element 42 detects two pulse beams of the pulse light due to the flare and the reflected pulsed light or (b) whether the photodetective element 42 detects one pulse beam of only the reflected pulsed light. In the case of the former (a), the arithmetic control unit 1 recognizes the second pulsed beam as the reflected pulse light in the measurement in the ranging optical path and executes the above time measurement and arithmetic to make the display DSP display the arithmetic result. In the case of the latter (b), the arithmetic control unit 1 recognizes the first pulse beam as the reflected pulsed light in the measurement in the ranging optical path and executes the time measurement and arithmetic to make the display DSP display the arithmetic result. If the reflected pulse light is too weak to be detected, the arithmetic control unit will make the display DSP display an indication of measurement impossible (error) in the initial stage.

Figure 7:
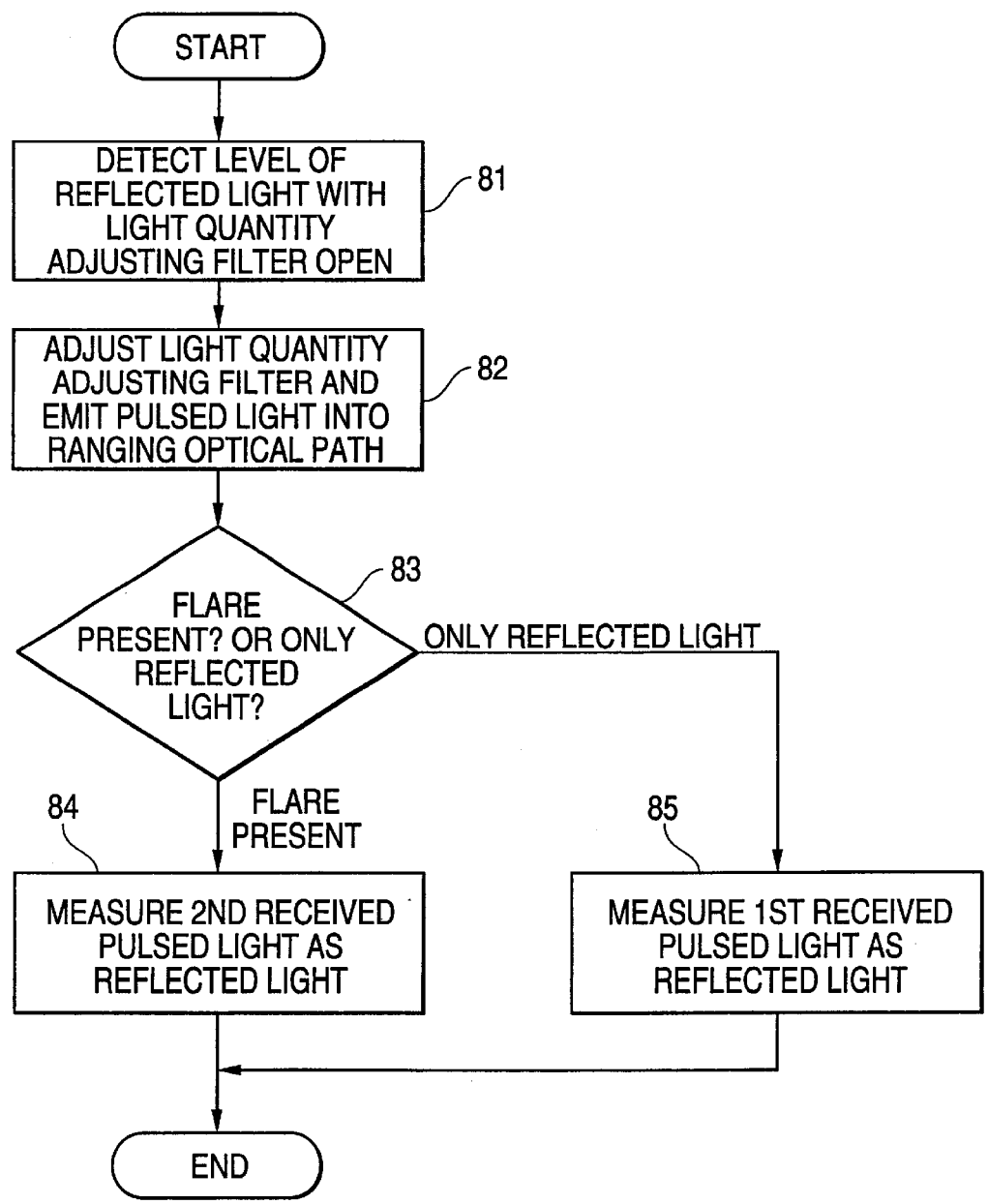
FIG. 7 is a flowchart of the measuring method by the present electro-optic distance measuring apparatus TS.
Figure 8:
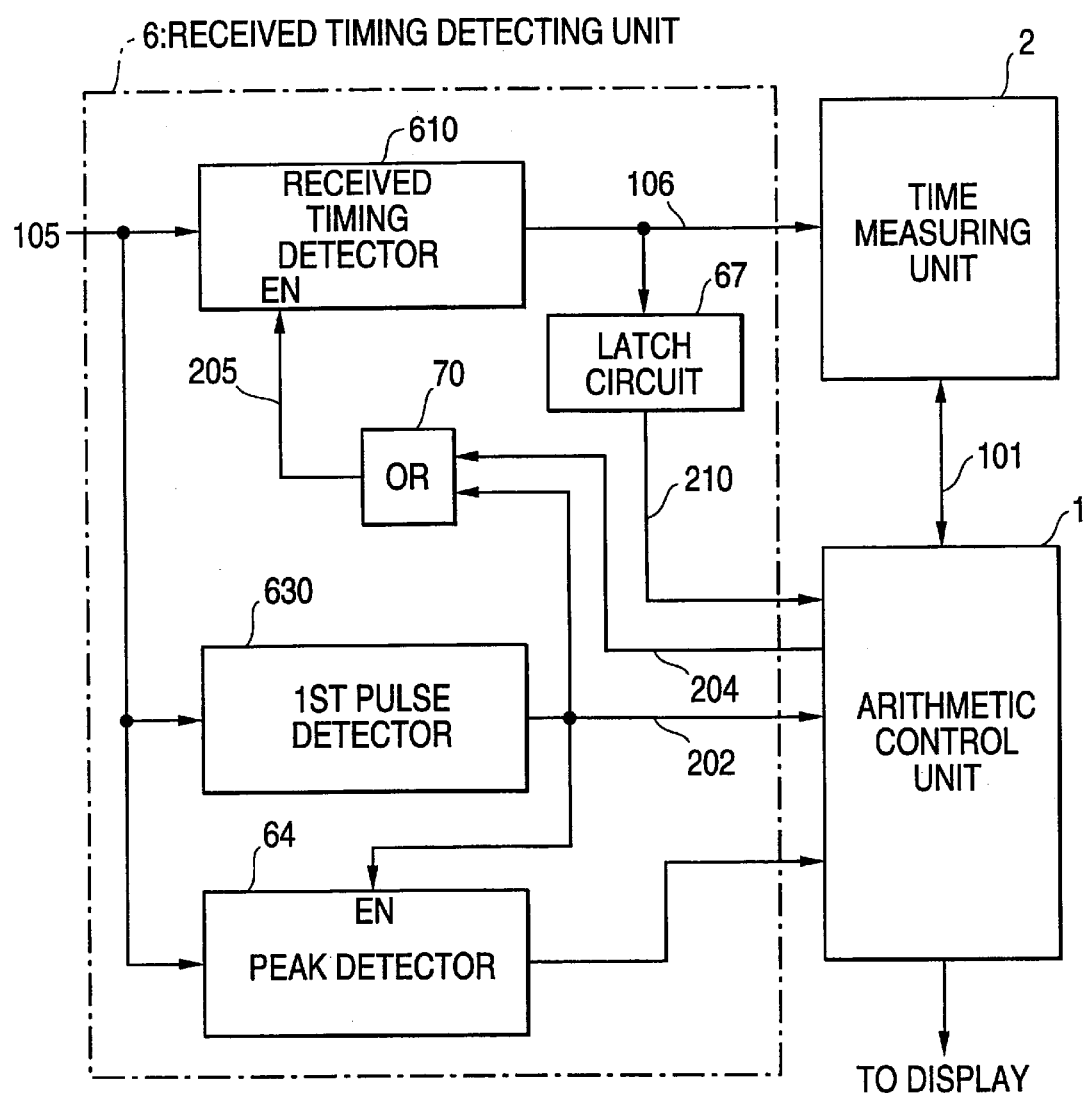
FIG. 8 is a schematic, structural drawing of received timing detecting unit 6 of the present embodiment.

FIG. 7 is a flowchart of the measuring method by the apparatus TS. FIG. 8 is a schematic, structural view of the received timing detecting unit 6 of the present embodiment. As shown in FIG. 7, the apparatus TS detects a level of the reflected pulsed light in the ranging optical path in the open state of the light quantity adjusting filter 314 (step 81). If the distance to the measured object is greater than the maximum measured distance or if the reflectivity of the measured object is too low, a measurement error will be given to tell that the intensity of the reflected pulsed light is too weak to detect.

When a reflected pulsed is detected in same quantity of light, the driving motor 322 is actuated by a drive signal from the arithmetic control unit 1 in accordance with the method described above to drive the light quantity adjusting filter 314, thereby adjusting the attenuation rate thereof (step 82).

After that, the pulsed light is sent again into the ranging optical path in the adjusted state of the light quantity adjusting filter 314. Then carried out is a flare/pulse light detecting step to determine if the light receiving system detects either one pulse beam or two pulse beams against the pulsed light thus sent. When two pulse beams are detected, it is determined that there is the flare; when only one pulsed beam is detected, it is determined that there is no flare and only reflected light exists (step 83).

Then the pulsed light is finally sent again into the ranging optical path. According to the above—determination, the distance is measured while regarding the second received pulsed beam as the reflected pulse light (step 84) or the distance is measured while regarding the first received pulse beam as the reflected pulsed light (step 85).

Accordingly, the distance measurement without an error due to the flare can be done by sending the pulsed light into the ranging optical path and detecting the received pulsed light three times in total.

This step of three stages is carried out by the received timing detecting unit 6 shown in FIG. 8. This received timing detecting unit 6 has fundamental components of received timing detecting circuit 610 and first pulse detecting circuit 630. A setpoint signal 204 set by the arithmetic control unit 1 controls the operation of the received timing detecting circuit 610 in such a way that the received timing detecting circuit 610 detects a pulse signal after photoelectric conversion of the first pulsed beam or in such a way that the received timing detecting circuit 610 detects a pulse signal resulting from photoelectric conversion of the second pulsed beam after the first pulse detecting circuit 630 detects the first pulse signal. For that operation, the setpoint signal 204 and a detection signal 202 by the fist pulse detecting signal 630 are supplied to OR circuit 70 and either one of the signals changes enable signal 205 to the active level (for example, to the H level).

The received timing detecting unit 6 of FIG. 8 further has a peak detecting circuit 64, which is activated by the detection signal 202 from the first pulse detecting circuit 630 and which detects the level of the peak of the pulse signal received second and informs the arithmetic control unit 1 of the detection result. When the received timing detecting circuit 610 detects a pulse signal 105 equal to or greater than the predetermined level, for example, the H level is stored in latch circuit 67.

This circuit is configured under the assumption that the pulse signal due to the flare is always detected when the light quantity adjusting filter 314 is open. First, in step 81 shown in FIG. 7, the arithmetic control unit 1 sets the setpoint signal 204 to the L level and monitors detection output 210 from the latch circuit 67 to detect whether the pulse signal 105 is detected by the received timing detecting circuit 610 after the pulse signal due to the flare is detected by the first pulse detecting circuit 630. When the second pulse signal has the minimum level just enough to be detected, the peak level of the second pulse signal (the pulse signal after photoelectric conversion of the reflected pulse light from the measured object) is detected by the peak detecting circuit 64. According to this detection level, the arithmetic control unit 1 sets the attenuation rate of the light quantity adjusting filter 314 as described above.

In step 82 the arithmetic control unit 1 again sets the setpoint signal 204 to the L level and sends the pulsed light into the ranging optical path. In this stage it is determined based on the detection signal 106 to the latch circuit 67 whether two pulse signals or one pulse signal is detected under the light quantity adjusting filter 314 adjusted in the above step. Namely, the above adjustment of the light quantity adjusting filter 314 is carried out under the precondition that the reflected pulsed light can be detected. Therefore, according to the attenuation of the light quantity adjusting filter 314, two pulses or one pulse is detected depending upon whether the pulse light due to the flare has the quantity of light enough to be detected.

When the setpoint signal 204 is set in the L level, the received timing detecting circuit 610 is activated after the first pulse detecting circuit 630 detects the first pulse signal. Therefore, the detection output 106 of the received timing detecting circuit 610 is output only when two pulse signals are detected. This turns the output 210 of the latch circuit 67 to the H level. When only one pulse signal is detected, the output 210 of the latch circuit 67 is kept in the L level.

Accordingly, the arithmetic control unit 1 can determine whether the pulse signal due to the flare is present or absent, by monitoring the output 210 from the latch circuit 67.

Once the determination is made as to whether the pulse signal due to the flare is present or absent, then step 84 is carried out to set the setpoint signal 204 to the L level and the received timing detecting circuit 610 detects the second pulse signal as a signal of the reflected pulse light and detects its timing; on the other hand, in step 85, the setpoint signal 204 is set to the H level and the received timing detecting circuit 610 detects the first pulse signal as a signal of the reflected pulsed light and detects its timing.

Figure 9:
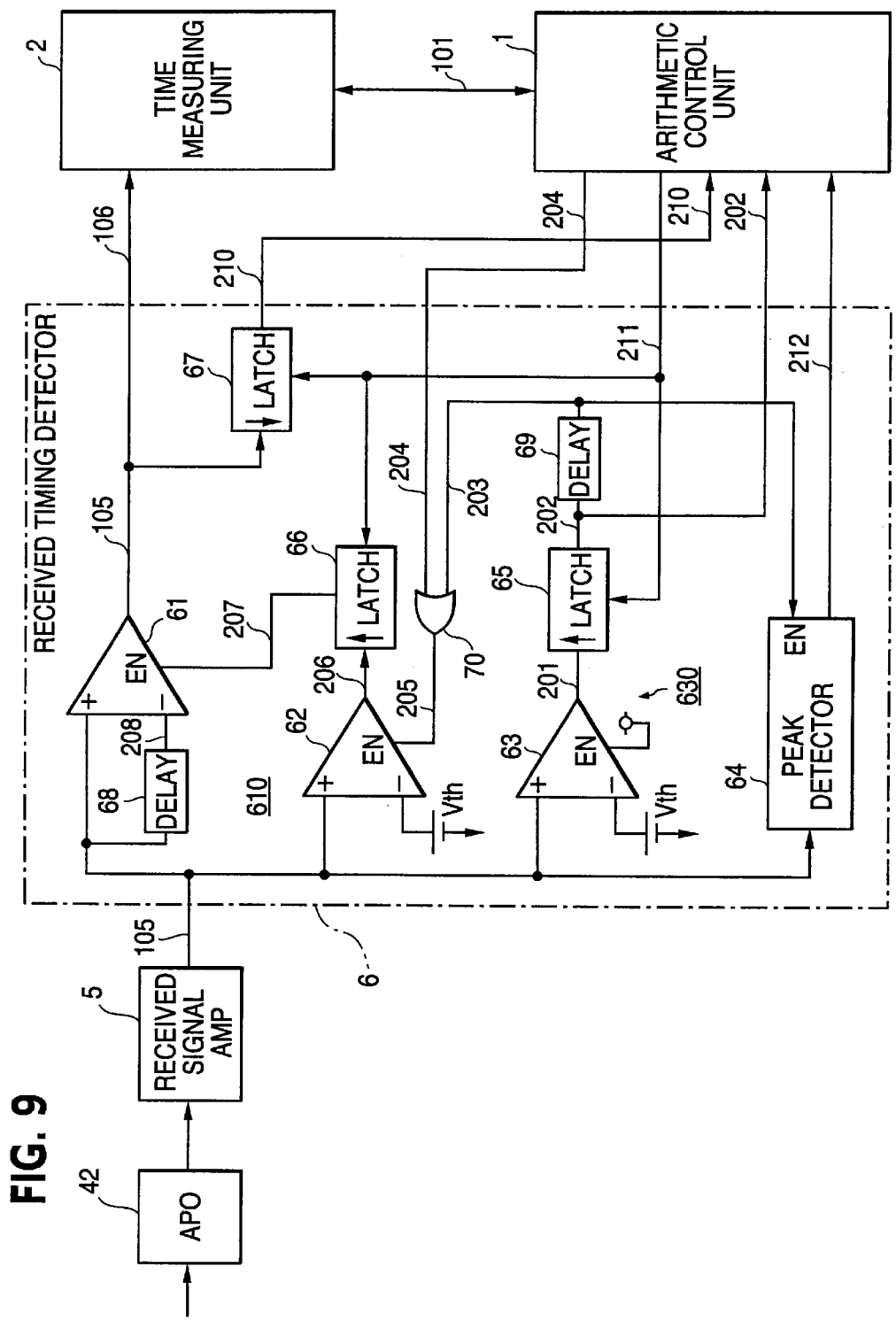
FIG. 9 is a detailed circuit diagram of the received timing detecting unit 6 of the present embodiment.

FIG. 9 is a detailed circuit diagram of the received timing detecting unit 6 of the present embodiment. In this detailed circuit example, the first pulse detecting circuit 630 shown in FIG. 8 is composed of a comparator 63 for detecting a received pulse signal 105 exceeding the predetermined threshold level Vth, a latch circuit 65 for latching the detection output 201 therefrom, and a delay unit (delay circuit) 69. The enable terminal of this comparator 63 is connected to the power supply to be fixed in the H level, thus being always in the active state.

The received timing detecting circuit 610 shown in FIG. 8 is composed of a comparator 62 for detecting the received pulse signal 105 exceeding the predetermined threshold level Vth, a latch circuit 66 for latching the detection signal 206 therefrom, a comparator 61 activated by the output of the H level from the latch circuit 66, and a delay unit 68. The comparator 61 and delay unit 68 can output the received timing of the received pulse signal 105 as detection signal 106 at constant timing, independent of the detection level of the received pulse signal 105. This comparator 61 detects the timing only when the comparator 62 corresponding to the second pulse detecting circuit detects the pulse signal 105 at or over the threshold value, thereby cutting noise-level signals.

The peak detecting circuit 64 is activated by delay signal 203 of detection signal 202 from the first pulse detecting circuit and the latch circuit 67 latches the timing detection signal 106, which is the same as in the case of FIG. 8.

FIGS. 10A to 10I and FIGS. 11A to 11L are timing charts for explaining the operation of the circuit of FIG. 9. FIG. 10A to FIG. 10I are timing charts where the pulsed light sent into the reference optical path is detected and where the pulsed light in the ranging optical path is detected under the determination of absence of flare. Namely, they are the charts where the setpoint signal 204 is set in the H level. FIGS. 11A to 11L are timing charts where presence/absence of flare is determined after the light quantity adjusting filter 314 is adjusted and where the pulsed light in the ranging optical path is detected under the determination of presence of flare. Namely, they are the charts where the setpoint signal 204 is set in the L level.

First described is the case wherein the setpoint signal 204 is set in the H level, as shown in FIG. 10A. When the setpoint signal 204 is set in the H level by the arithmetic control unit 1, the output 205 from the OR circuit 70 is also set in the H level. When the pulsed light is projected at that time, the pulsed light is received via the reference optical path or via the ranging optical path and the pulse signal 105 after photoelectric conversion thereof is received. The comparator 62 in the received timing detecting circuit constitutes the second pulse signal detecting circuit and is already in the active state because of the H level of the setpoint signal 205. Therefore, it detects the received pulse signal 105 exceeding the threshold Vth and outputs the signal 206. This causes the latch circuit 66 to hold the H level. Therefore, the H level of the output 207 therefrom activates the comparator 61 to detect a cross point between the received pulse signal 105 and the pulse signal 208 slightly delayed by the delay unit 68. The detection signal 106 is supplied to the time measuring unit 2.

Next described is the case wherein the setpoint signal 204 is set in the L level, as shown in FIG. 11A. In this case, the comparator 63 constituting the first pulse detecting circuit detests the first pulse signal to activate the comparator 62 by the signal 203 delayed by the delay unit 69. When the comparator 62 detects the second pulse signal, the comparator 61 detects its timing.

Describing in further detail, since the setpoint signal 204 is set in the L level, the comparator 62 is in the inactive state. The first pulse signal 105 due to the flare is detected by the comparator 63. Then the detection signal 201 thereof causes the latch circuit 65 to hold the H level. The output signal 202 from the latch circuit 65 is delayed by the delay unit 69 and the delayed signal is supplied to the OR circuit 70 to activate the comparator 62. Similarly, the peak detecting circuit 64 is also activated.

Then the peak detecting circuit 64 detects a peak value of the received pulse signal 105 after photoelectric conversion of the second pulsed light reflected from the measured object, and the detection signal 212 is supplied to the arithmetic control unit 1. At the same time, the second pulse signal is detected by the comparator 62 and its timing is detected at the rise edge of the detection signal 106 by the comparator 61 in the same manner as above. The detection signal 106 is supplied to the time measuring unit 2 and to the latch circuit 67. Thus, the time measuring unit 2 continues measuring the time until the timing of reception of the second pulse signal. The arithmetic control means 1 can determine whether the pulsed light due to the flare is detected or the both beams of the pulsed light due to the flare and the reflected pulsed light are detected, by monitoring the output 202 of the latch circuit 65 and the output signal 210 of the latch circuit 67.

The overall measurement flowchart utilizing the circuit of FIG. 9 is shown in FIG. 12. In this flowchart steps 91 to 93 are the measuring steps where the pulsed light is sent into the reference optical path, which are carried out in the H level of the setpoint signal 204 as described above. Steps 810 to 815 correspond to step 81 in the flowchart of FIG. 4. Further, steps 820 to 823 correspond to step 82 in the flowchart of FIG. 4, and steps 840, 841 and steps 850, 851 correspond to steps 84 and 85, respectively, in the flowchart of FIG. 4. Step 95 is a step of impossible measurement where the reflected pulsed light does not have the sufficient quantity.

In the flowchart shown in FIG. 12, the first stage is to send the pulse light into the reference optical path and carry out the measurement (steps 91 to 93). After that, the ranging optical path is set by the shutter 321 (step 94), and the second stage is carried out to open the light quantity adjusting filter, set the setpoint signal 204 in the L level, check whether the second pulse signal is in the detectable level, and detect the peak level thereof (steps 810 to 815). The third stage is to adjust the light quantity adjusting filter according to the level of the reflected pulsed light detected and determine whether one pulse signal or two pulse signals are detected (steps 820 to 823). The final stage is to set the setpoint signal to the L level or to the H level, depending upon presence or absence of flare, and to carry out the normal measurement in the ranging optical path (steps 840, 841, 850, 851).

The operation will be described in accordance with the flowchart. The arithmetic control unit 1 controls the path changeover shutter 321 to set the photodetective element 42 to the reference optical path 330 side (step 91). Then the setpoint signal 204 is set in the H level (step 92); thereafter, the pulsed light is sent into the reference optical path and the comparator 61 detects the timing of the received pulse signal of the reference pulse light (step 93). From the time measured at that time and the speed of light, the arithmetic control unit 1 calculates the detected distance Lref of the reference optical path.

Then the arithmetic control unit 1 controls the path changeover shutter 321 to set the photodetective element 42 on the ranging optical path side (step 94). Then the setpoint signal 204 is set in the L level (step 810); the driving motor 322 is driven to open the ranging optical path side of the light quantity adjusting filter 314 (step 811); the pulse light is sent into the ranging optical path (step 812).

In this case, because of the structure of the optical system, the pulse light of high power is reflected, for example, by the inside surface of objective lens 305 to produce the flare, the photodetective element 42 detects the pulsed light due to the flare, and the comparator 63 being the first pulse detecting circuit detects the received pulse signal 105 after photoelectric conversion thereof. Then the signal 203 delayed by the fixed time activates the comparator 62 and peak detecting circuit 64. Thereafter, reception of the second pulse signal is waited (step 813). When a reflected pulse signal in or above the predetermined level is detected as the second pulse light, the latch circuit 67 outputs the H level and the peak detecting circuit 64 detects the peak level thereof to supply the detection signal 212 to the arithmetic control unit 1 (step 814).

When the reflected pulse signal is detected, the output signal 210 of the latch circuit 67 turns to the H level, and the arithmetic control unit determines that the measurement is possible with a reflected pulse signal that can be measured. When the signal 210 remains in the L level, the arithmetic control unit determines that the measurement is impossible with the flare but without a reception signal from the reflected pulse light (step 95).

When it is determined that the flare is present and that the reception signal of the reflected pulsed light is also present (step 820), the quantity of the reflected pulsed light is adjusted according to the peak value detected (step 821), and the pulse light is again sent into the ranging optical path (step 822). In this case, the pulsed light due to the flare will not be detected because of too much attenuation or will be detected, depending upon the attenuation rate of the light quantity adjusting filter 314. Only one pulse signal will be detected in the former case while two pulse signals of the flare and reflected light will be detected in the latter case. Therefore, the first pulse signal is detected after the signal 202 is turned to the H level (step 823); thereafter, the arithmetic control unit 1 monitors whether or not the signal 210 turns to the H level (step 830).

The signal 210 remaining in the L level means that only one pulse signal was detected, so that the arithmetic control unit 1 executes the distance measuring step in the state of absence of flare (step 850). The signal 210 turning to the H level means that two pulse signals were detected, so that the arithmetic control unit 1 executes the distance measuring step in the state of presence of flare (step 840).

Specifically when it is determined that the flare is absent, the arithmetic control unit 1 sets the setpoint signal 204 to the H level and measures the delay time of the reflected pulsed light in the ranging optical path in accordance with the first pulse signal (step 851). When it is determined that the flare is present, the arithmetic control unit 1 sets the setpoint signal 204 to the L level and measures the delay time of the reflected light in the ranging optical path in accordance with the second pulse signal. Accordingly, the measurement error due to the flare can be eliminated even in the structure of optical system in which the flare is produced.

The arithmetic control unit 1 may give an instruction about whether activation of the comparators should be delayed. Before start of distance measurement, the operator may move the focusing lens 306 back and forth as observing the object through the collimation optical system by operator's eye 319, thereby making the system in focused on the object. For detecting whether the object is located more distant from a predetermined value, a limit switch is provided for detecting whether the position of the focusing lens 306 is within a specific range. When the focusing lens 306 is moved toward the far extreme in order to focus the system on the measured object located farther than the predetermined value, the limit switch detects that the focusing lens 306 is on the farther side than the predetermined position and outputs a detection signal to the arithmetic control unit 1.

As stated above, the apparatus comprises a lens mounted in a housing; a light emitting element disposed in the housing so that output pulsed light emitted therefrom passes through the lens; a photodetective element disposed in the housing so that input pulsed light having passed through the lens is incident thereon; and a display electrically connected to the photodetective element, wherein when in a period between a time of emission of first output pulsed light and a time of emission of second output pulsed light two input pulse beams are incident into the photodetective element in response to the first output pulsed light, the display displays distance information evaluated from the speed of light and a period between the time of emission of the first output pulsed light and a time of incidence of the second input pulsed light.

As described above, the present invention can eliminate the error of measured distance due to the flare. Although the method of the present invention is a pulsed light distance measuring method in the coaxial structure of the sending optical system and receiving optical system, it is free of the measurement error due to the flare produced.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A distance measuring apparatus for measuring a distance to a target, the apparatus comprising:
    a housing;
    a lens mounted to the housing so that light passing through the lens enters or exits the housing;
    a light emitting element disposed in the housing for emitting pulsed light toward the target through the lens;
    a photo-detective element disposed in the housing;
    an optical system including:
        a first optical path provided in the housing for emitting pulsed light from the light emitting element to the target through to the lens;
        a second optical path provided in the housing for receiving pulsed light from the lens to the photo-detecting element, wherein the distance is measured based on a timing difference between a first time at which a pulsed light is emitted from the light emitting element toward the target and a second time at which pulsed light reflected off the target is incident on the photo-detecting element, after the pulsed light is emitted,
        wherein the lens is positioned in the path of both the first and second optical paths;
    a filter for adjusting light quantity arranged in the housing, in the second optical path;
    a light flare detecting means for detecting the existence of light flare based on an output from the photo-detecting element, wherein the light flare to be detected is generated in response to the pulsed light in the first optical path reflecting off at least an inner surface side of the lens, and wherein the second optical path guides the generated light flare to the photo-detecting element;
    a reference optical path extending in the housing from the light emitting element to the photo-detecting element, without passing through the lens; and
    a shutter disposed in the reference optical path, wherein a pulsed light emitted from the light emitting element becomes incident on the photo-detecting element when the shutter is open.

2. A distance measuring apparatus according to claim 1, further comprising an attenuator disposed in the reference optical path.

3. A distance measuring apparatus according to claim 2, further comprising a display.

4. A distance measuring apparatus according to claim 3, further comprising control means for calculating a first length of the reference optical path by opening the shutter to direct a pulsed light through the reference optical path, emitting the pulsed light from the light emitting element, and receiving the pulsed light that has traveled through the reference optical path by the photo-detecting element, the control means calculating the first length based on a period between emission of the pulsed light from the light emitting element and detection of the pulsed light by the photo-detecting element.

5. A distance measuring apparatus according to claim 4, wherein the control means further calculates a second length, which is the length of a pulsed light traveled through the first path, from the lens to the target, from the target to the lens, and the second optical path, by closing the shutter to direct the pulsed light through the first and second optical paths, emitting the pulsed light from the light emitting element, detecting the pulsed light at the photo-detecting element after the pulsed light travels through the first optical path, from the lens to the target, from the target to the lens, and the second optical path, the control means calculating the second length based on a period between emission of the pulsed light from the light emitting element and detection of the pulsed light by the photo-detecting element.

6. A distance measuring apparatus according to claim 5, wherein the control means calculates a true distance to the target by subtracting the first length from the second length and dividing the result by two.

7. A distance measuring apparatus according to claim 6, further comprising a rotary encoder, the housing being rotatable in a vertical plane around a horizontal axis, the rotary encoder measuring an angle of rotation of the housing, the control means calculating a horizontal distance component based on an output of the rotary encoder and the calculated true distance.

8. A distance measuring apparatus according to claim 5, wherein the control means further determines whether a distance measurement is possible based on detecting levels of pulsed light detected by the photo-detecting element while the light quantity adjusting filter is open and the shutter is closed, wherein the control means displays an error message on the display when the measurement is not possible to measure.

9. A distance measuring apparatus according to claim 8, wherein the control means controls a drive of the light quantity adjusting filter so that equal levels of pulsed light travels through the reference optical path and through the path in which the second length travels when the measurement is possible.

* * * * *